United States Patent
Sun et al.

(10) Patent No.: US 10,051,710 B2
(45) Date of Patent: Aug. 14, 2018

(54) LED DRIVER AND AN LED DRIVING METHOD

(71) Applicant: PHILIPS LIGHTING HOLDING B.V., Eindhoven (NL)

(72) Inventors: Shiguang Sun, Shanghai (CN); Lyle Liu, Shanghai (CN); Liwen Zhou, Shanghai (CN)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/576,359

(22) PCT Filed: May 20, 2016

(86) PCT No.: PCT/EP2016/061369
§ 371 (c)(1),
(2) Date: Nov. 22, 2017

(87) PCT Pub. No.: WO2016/188880
PCT Pub. Date: Dec. 1, 2016

(65) Prior Publication Data
US 2018/0153020 A1    May 31, 2018

(30) Foreign Application Priority Data

May 22, 2015  (CN) ................. PCT/CN2015/079588
Oct. 29, 2015  (EP) ..................................... 15192096

(51) Int. Cl.
*H05B 33/08*    (2006.01)
*H02M 3/335*    (2006.01)
(Continued)

(52) U.S. Cl.
CPC .......... *H05B 33/0887* (2013.01); *H02M 1/36* (2013.01); *H02M 1/4266* (2013.01);
(Continued)

(58) Field of Classification Search
None
See application file for complete search history.

(56) References Cited

U.S. PATENT DOCUMENTS 5,486,992 A    1/1996  Koscica et al.
7,333,353 B2   2/2008  Yin
(Continued)

FOREIGN PATENT DOCUMENTS

WO    2011137646 A1    11/2011
WO    2015090236 A1     6/2015

*Primary Examiner* — Crystal L Hammond
(74) *Attorney, Agent, or Firm* — Akarsh P. Belagodu (57) ABSTRACT

An LED driver, comprising: an inductive switch mode converter having an inductive component (16,22), an LED output (30) for an LED load and a main converter switch (18) for controlling a current flowing through the inductive component; a sensor (32) for generating a sensor signal indicative of the output current or voltage provided to the LED output; a feedback element (34) which provides a feedback path for feeding back the sensor signal for control of the main converter switch (18); and a processing circuit (50) for processing the sensor signal which has been fed back, wherein the processing circuit is adapted to generate an output when there is no sensor signal so as to limit the current flowing through the main converter switch when no sensor signal is present.

15 Claims, 4 Drawing Sheets

(51) Int. Cl.
*H02M 1/36* (2007.01)
*H02M 1/42* (2007.01)
*H02M 1/00* (2006.01)

(52) U.S. Cl.
CPC .... *H02M 3/33553* (2013.01); *H05B 33/0815* (2013.01); *H02M 2001/0009* (2013.01); *H02M 2001/0025* (2013.01)

(56) References Cited

U.S. PATENT DOCUMENTS

| | | |
|---|---|---|
| 8,493,752 B2 | 7/2013 | Lin et al. |
| 2003/0042879 A1 | 3/2003 | Huh et al. |
| 2004/0032754 A1 | 2/2004 | Yang |
| 2005/0213355 A1 | 9/2005 | Koike |
| 2006/0209573 A1 | 9/2006 | Yin |
| 2009/0185397 A1* | 7/2009 | Forghani-Zadeh ..... H02M 1/36 363/18 |
| 2010/0295470 A1 | 11/2010 | Koutensky |
| 2011/0026278 A1 | 2/2011 | Yin |
| 2012/0169245 A1* | 7/2012 | Chen ................ H02M 3/33523 315/223 |
| 2012/0250366 A1 | 10/2012 | Wang et al. |
| 2016/0323949 A1* | 11/2016 | Lee .................... H05B 33/0845 |

\* cited by examiner

LED DRIVER AND AN LED DRIVING METHOD

CROSS-REFERENCE TO PRIOR APPLICATIONS

This application is the U.S. National Phase application under 35 U.S.C. § 371 of International Application No. PCT/EP2016/061369, filed on May 20, 2016, which claims the benefit of International Patent Application No. PCT/CN2015/079588, filed on May 22, 2015 and European Patent Application No. 15192096.4, filed on Oct. 29, 2015. These applications are hereby incorporated by reference herein.

FIELD OF THE INVENTION

The invention relates to an LED driver and an LED driving method. It relates in particular to a driving method in which a power converter which drives an LED arrangement is controlled using a feedback signal.

BACKGROUND OF THE INVENTION

In an LED driver which uses feedback, a signal representing the voltage at the output or the current flowing to the output is fed back to enable control of the power converter.

The power converter typically comprises an inductive switch mode power supply. The current flowing through an inductive element is controlled by a main converter switch, and the duty cycle with which the switch is controlled determines the power conversion ratio.

It is required to prevent that the inductive element becomes saturated, since the current can then run out of control. In normal operation, the feedback mechanism prevents this saturation. However, there may be a delay before the feedback mechanism is effective, so that at start-up of the power converter, the currents flowing may be out of control. For example, if there is a short circuit condition at the output when the power converter is initially turned on, excessive currents may flow before the feedback mechanism is able to regulate the system.

In order to address this problem, the inductive element is typically scaled up to prevent it becoming saturated.

An alternative is to implement a soft start circuit to limit the initial current through an inductive element. However, this generally requires significant additional control circuitry and is therefore expensive to implement.

U.S. Pat. No. 7,333,353 discloses a self-oscillating flyback converter with a soft start function. The soft start function influences the initial ramping up of current through the main converter switch.

SUMMARY OF THE INVENTION

There is therefore a need for a soft start circuit with a low number of components, and therefore low cost, but with high performance and reliability. To better address this need, the invention is defined by the claims.

According to examples in accordance with an aspect of the invention, there is provided an LED driver, comprising:
an inductive switch mode converter having an inductive component, an LED output for an LED load and a main converter switch for controlling a current flowing through the inductive component;
a sensor for generating a sensor signal indicative of the output current or voltage provided to the LED output;
a feedback element which provides a feedback path for feeding back the sensor signal for control of the main converter switch; and
a processing circuit for processing the sensor signal which has been fed back, wherein the processing circuit is adapted to generate an output when there is no sensor signal so as to limiting the current flowing through the main converter switch when no sensor signal is present.

A delay in generating a sensor signal after start-up of the driver can cause the feedback path to be inactive during that time. Without the feedback control being active, the converter inductive element may become saturated and this may potentially cause failure of the main converter switch. In order to solve this problem, the processing circuit functions as a soft start circuit, in that it generates an output when there is no sensor signal. The output of the processing circuit serves to protect the main converter switch and protect the inductor from being saturated by limiting the current flowing even when the sensor is not feeding back any signal. It should be noted that the above defined "output" intends to cover an indicator is provided by the processing circuit and the indicator may be implemented in various way. For example, a high level signal such as voltage or current can be served as the output to limit the current; alternatively, an absence of a voltage or current can be served as the output to limit the current.

A further embodiment is that once the sensor is active, the processing circuit no longer generates the output, thus the current is not limited by the processing circuit. In this case, the feedback element completely takes over control of the main converter switch.

The switch mode converter may comprise a transformer with a primary side and a secondary side with the LED output on the secondary side, wherein:
the main converter switch is on the primary side for controlling the current flowing through the primary side of the transformer;
the sensor is on the secondary side; and
the feedback element provides a feedback path from the secondary side to the primary side for feeding back the sensor signal for control of the main converter switch.

This defines a transformer based inductive element. The secondary side of the transformer in this example may form an isolated switch mode converter. The converter for example comprises an isolated flyback converter.

The sensor for example comprises a comparator for comparing an output voltage from the secondary side of the transformer with a reference and providing a feedback signal to the feedback path. This feedback signal is then used to control the switching of the switch mode converter, in order to provide current or voltage regulation of the output. The feedback element may comprise an optical coupler. This means there is full electrical isolation between the primary side and the secondary side, with the interface between the two being defined by the transformer and the optical coupler.

The converter may comprise:
a first transformer winding, which is used to charge the control terminal of the main converter switch to turn on the main converter switch, wherein the main converter switch is coupled to a second transformer winding;
a shunt resistor through which a current is driven by the main converter switch;
a control transistor which is turned on by the voltage across the shunt resistor when the current has reached a sufficient level, wherein the control transistor is coupled to the control terminal of the main converter switch and is adapted to turn off the converter main switch when it is turned on.

This circuit has a cyclic operation. When the main converter switch is turned on, current is driven through the main switch, and as this increases, the shunt resistor voltage increases. Eventually, the shunt resistor voltage is sufficient to force the control transistor to turn off the main converter switch (e.g. by discharging the control terminal to ground), so ending the active part of the converter cycle. The control terminal then starts to charge up again from the first winding until the main converter switch is turned on once more.

The processing circuit output is coupled to the control terminal of the control transistor thereby to inject current into the control terminal.

The feedback path is in this way used to bias the control transistor by injecting current into its control terminal. This then makes the control transistor turn on earlier and makes the main converter switch turn off earlier, thereby limiting the current through the inductive component, and influences the duty cycle of the switching of the main converter switch and thus changes conversion ratio of the switch mode converter.

The processing circuit may comprise a pass transistor for passing a current from the first winding to the processing circuit output when the pass transistor is turned on, and a control transistor for controlling the pass transistor, such that the control transistor is adapted to turn off the pass transistor in response to the presence of a feedback signal, and the pass transistor is adapted to be turned on by default in the absence of switching by the control transistor.

There is thus a pass function which forces current into the feedback path when there is no real feedback signal. Thus, the pass transistor may be considered to inject a fake feedback signal during a start-up phase, before the real feedback path is active.

The control transistor may comprise a pnp bipolar transistor with its emitter coupled to the first winding, its base coupled to the feedback element, and its collector coupled to ground through a resistor, and the pass transistor may comprise a pnp bipolar transistor with its emitter coupled to the first winding, its base coupled to the collector of the control transistor, and its collector coupled to the processing circuit output through a resistor.

This provides a simple two-transistor implementation of the processing circuit.

In one set of examples, the converter comprises a ringing choke converter, and wherein the first winding comprises a transformer primary side auxiliary winding and the second winding comprises a transformer primary side main winding.

In another set of examples, the first winding comprises a transformer secondary side winding and the second winding comprises a transformer primary side winding. This is another design of buck-boost converter using a transformer, but without a ringing choke auxiliary winding.

Examples in accordance with another aspect of the invention provide an LED driving method, comprising:
converting an input power supply using an inductive switch mode converter which comprises an inductive element and a main converter switch for controlling a current flowing through the inductive element;
providing a current to an LED arrangement;
generating a sensor signal indicative of the output current or voltage provided to the LED arrangement; and
feeding back the sensor signal for control of the main converter switch, wherein the method comprises processing the sensor signal which has been fed back to create a processed feedback signal, wherein a processed feedback signal is generated when there is no sensor signal, so as to limiting the current flowing through the main converter switch when no sensor signal is present.

This method provides a soft start function, in that it generates feedback signal when there is no sensor signal. Processing of the sensor signal serves to protect the main converter switch by limiting the current flowing even when the sensor is not feeding back any signal. Once the sensor is active, it takes over control of the main converter switch.

The switch mode converter may comprise a transformer with a primary side and a secondary side, wherein the main converter switch is for controlling the current flowing through the primary side of the transformer, wherein generating a sensor signal comprises comparing an output voltage from the secondary side of the transformer with a reference.

The converting may comprise:
using a first auxiliary winding to charge the control terminal of the main converter switch to turn on the main converter switch, wherein the main converter switch is coupled to a second winding;
driving a current through a shunt resistor by the main converter switch; and
turning on a control transistor by the voltage across the shunt resistor when the current has reached a sufficient level, wherein the control transistor is coupled to the control terminal of the main converter switch and turns off the converter main switch when it is turned on.

The processing circuit output is preferably coupled to the control terminal of the control transistor to inject current into the control terminal. This current injection changes the bias of the control transistor, and thereby alters the switching cycles of the main converter switch.

A current may be passed from the first winding (which may be an auxiliary primary side winding of a ringing choke converter) to the processing circuit output when it is turned on using a pass transistor, and the pass transistor may be controlled to turn off in response to the presence of a feedback signal. The pass transistor is preferably turned on by default in the absence of said controlling in response to the presence of a feedback signal.

"These and other aspects of the invention will be apparent from and elucidated with reference to the embodiment(s) described hereinafter."

BRIEF DESCRIPTION OF THE DRAWINGS

Examples of the invention will now be described in detail with reference to the accompanying drawings, in which.

DETAILED DESCRIPTION OF THE EMBODIMENTS

The invention provides an LED driver, comprising an inductive switch mode converter which uses a feedback arrangement for controlling the main converter switch. A processing circuit is used to process a feedback sensor signal so that an output is generated even when there is no feedback sensor signal. This output is used to limit the current flowing through the main converter switch when no sensor signal is present, and it provides a soft start function.

Embodiments of the invention provides a protection mechanism which is of general applicability to an inductive switch mode converter in which a feedback signal is used to regulate the output.

By way of example only, the invention will be described as applied to a ringing choke isolated converter architecture. The ringing choke circuit provides the cyclic control of the main converter switch of the switch mode converter (rather than using a pulse width modulation circuit, for example), and the isolation is provided by a transformer. Isolation is desired to separate the driven load from the ac mains input to the power converter. The main switch of the converter is used to control the current through the primary side of the transformer, and the secondary side of the transformer defines the inductor of the switch mode converter circuit. It should be understood that other solutions of cyclic control are also applicable, such as using dedicated IC to cyclically control the main converter switch. It should also be understood that non-isolated architecture such as normal buck, boost or buck-boost type is also applicable as long as a feedback element is used for a control of the main converter switch.

Figure 1:
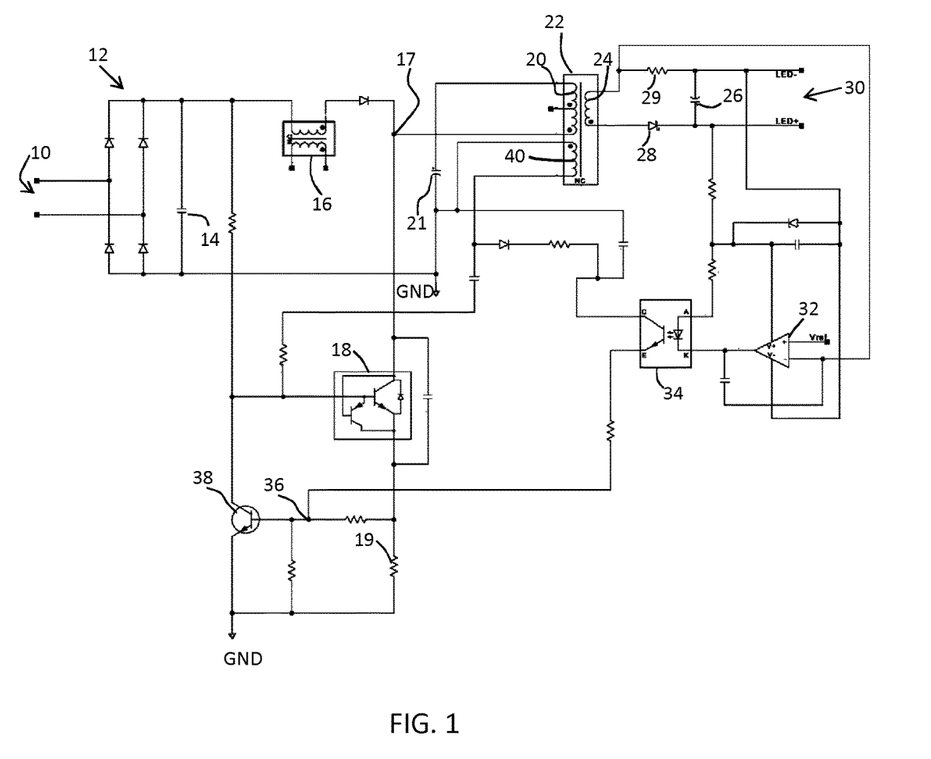
FIG. 1 shows a first known flyback LED driver.

An example of a known architecture of this type is shown in FIG. 1.

The circuit comprises a mains input 10 which is rectified by diode bridge rectifier 12. The rectified output is supplied across a capacitor 14 and through an inductor 16 which is used for power factor correction, and through a diode to form a filtered DC output 17.

The output 17 is connected to ground through a main converter switch 18 and shunt resistor 19, and also through the main primary side winding 20 of a transformer 22 through a capacitor 21 to ground.

The transformer 22 functions as an isolating element, and also as the inductive element of the switch mode converter. In particular, the secondary winding 24 forms the switch mode converter circuit with a capacitor 26 and diode 28. The circuit has an LED output 30 for an LED load.

At powering on of the circuit, before the main converter switch 18 is first turned on, the capacitor 21 which is for example a large electrolytic capacitor is charged by a current through the primary side winding 20 to a voltage greater than the peak mains voltage (i.e. to at least 325V for a 230V root mean square (rms) mains voltage.

When the main converter switch 18 is turned on, the inductor 16 is energized as a current is driven through the inductor 16 to ground through the switch 18 and resistor 19. The capacitor 21 magnetizes the flyback transformer 22, and the capacitor 21 discharges current to the transformer. The capacitor 21 is sufficiently large (and the frequency of operation sufficiently high) that the voltage across the capacitor 21 does not substantially alter during operation. During this time, the secondary winding does not conduct current as the current flow is blocked by the diode 28. Current is provided to the load by the capacitor 26.

When the main converter switch 18 is turned off, the inductor 16 is demagnetized. A current flows through the primary side winding 20 to recharge the capacitor 21. The decreasing current driven through the primary side winding 20 also transfers energy to the secondary side winding 24 which generates a current flow (in the forward direction of the diode 28) to recharge the capacitor 26. The capacitor 26 is thus charged based on the currents flowing in both the inductor 16 and the primary side winding 20. The transformer 22 is then working in forward mode in respect of charging the capacitor 26. The transformer 22 may thus be considered to operate in forward mode and flyback mode at the same time in this architecture.

A sense resistor 29 is connected in series with the LED load, so that the LED current passes through the sense resistor. Thus, the voltage across the sense resistor is representative of the output current. An output voltage on one side of the sense resistor 29 is provided to a comparator 32 which compares the voltage with a reference Vref and generates an output (which may be amplified as required). This is used to control the current driven through an optocoupler 34 which functions as a feedback element. The optocoupler provides electrical isolation between the primary side and the secondary side.

The comparator 32 and the optocoupler 34 together define a sensor for generating a sensor signal indicative of the output current provided to the LED output. This is used for current regulation of the output. Voltage regulation could instead be provided.

The current output from the optocoupler 34 is supplied to a node 36 and accordingly injects current to the base of a control transistor 38.

This connection between an auxiliary winding 40 and the main converter switch 18 forms part of a ringing choke converter architecture. The main converter switch 18 is driven by an auxiliary winding that is coupled to the primary winding. The principle of the ringing choke converter is explained below.

The primary side auxiliary winding 40 is used to charge the control terminal of the main converter switch 18 to turn on the main converter switch. When turned on, the main converter switch is then coupled to the primary side main winding 20 as explained above.

The control transistor 38 is turned on by the voltage across the shunt resistor 19 when the current has reached a sufficient level. Thus, even without the current injection from the feedback path, there is a cyclic operation of the circuit. When the control transistor 38 is turned on, it pulls down the control terminal (base) of the converter main switch 18 and thereby turns off the converter main switch when it is turned on.

This ends the active part of the converter cycle. The control terminal of the converter main switch 18 then starts to charge up again by the current path from the primary side auxiliary winding 40 due to the self-resonance of the auxiliary winding 40 until the main converter switch 18 is turned on once more.

The duty cycle of the circuit operation is influenced by the injection of current to the node 36.

A problem with this circuit is that if there is no feedback signal injected into the node 36 because the feedback circuit has not stabilised, but there is a short circuit at the output, the current through the inductor 16 and the inductors of the transformer 22 will increase rapidly and cause the inductors to become saturated. Thus, the current can run out of control.

Figure 2:
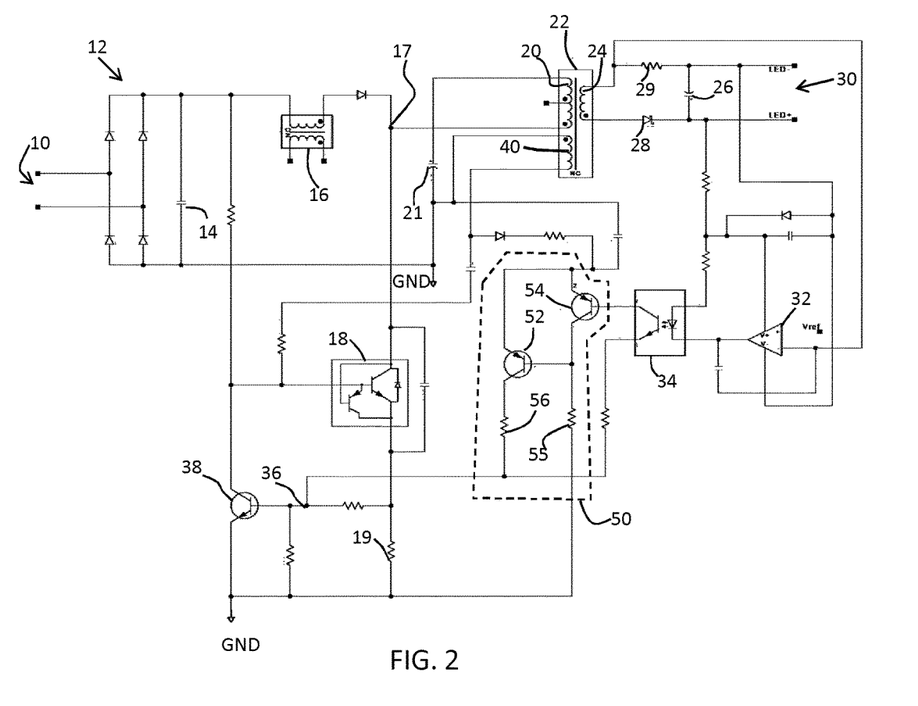
FIG. 2 shows a first example of a flyback LED driver in accordance with the invention based on the circuit of FIG. 1.

The invention provides a simple soft start circuit as shown in FIG. 2.

FIG. 2 is based on the circuit of FIG. 1 and the same reference numerals are used. The description of the repeated circuit components is not duplicated.

FIG. 2 shows a processing circuit 50 which processes the feedback signal. It has an output which is coupled to the control terminal 36 of the control transistor 38 thereby to inject current into the control terminal in the same way as for the circuit of FIG. 1.

The processing circuit 50 is arranged to generate an output even when there is no sensor signal. In this way, the output of the circuit processing 50 will limit the current flowing through the main converter switch when no sensor signal is present. This is typically at start-up of the LED driver, before the circuit components are stabilised. This is particularly important if a feedback signal would be generated because there is a high current flow, for example as a result of a short circuit at the output.

A delay in generating a sensor signal after start-up of the driver would then cause the feedback path to be inactive during that time. Without the feedback control being active, the converter inductive element may become saturated and this may potentially cause failure of the main converter switch.

The processing circuit 50 has a pass transistor 52 for passing a current from the auxiliary primary side winding 40 to the processing circuit output (i.e. to the node 36) when it is turned on. A control transistor 54 is used for controlling the pass transistor 52. The control transistor 54 turns off the pass transistor 52 in response to the presence of a feedback signal, whereas the pass transistor is normally turned on (i.e. turned on by default) in the absence of actively being switched off switching by the control transistor 52.

This pass function forces current into the node 36 when there is no real feedback signal. The processing circuit thus generates a fake initial feedback signal as if there is a large output current.

In the example shown in FIG. 2, the control transistor 54 comprises a pnp bipolar transistor with its emitter coupled to the auxiliary primary side winding 40, its base coupled to the optocoupler 34, and its collector coupled the control input of the pass transistor 52 and to ground through a resistor 55.

When current flows through the control transistor 54, it pulls up the collector which then turns off the pass transistor 52.

The pass transistor 52 comprises a pnp bipolar transistor with its emitter coupled to the auxiliary primary side winding 40, its base coupled to the collector of the control transistor 54, and its collector coupled to the processing circuit output through a resistor 56.

This provides a simple two-transistor implementation of the processing circuit. One transistor is turned on when the other is turned off, so that either the circuit functions in the same manner as the circuit of FIG. 1 (with the pass transistor off and the control transistor on) or it functions in a soft start mode (with the pass transistor on and the control transistor off because insufficient current is delivered by the optocoupler).

The invention has been described as applied to a ringing choke converter, as this is a driver architecture which is of interest for low cost solutions. However, the invention can also be applied to other switch mode converters, for example which make use of pulse width modulation to drive the converter main switch, or which do not make use of an auxiliary coil.

Figure 3:
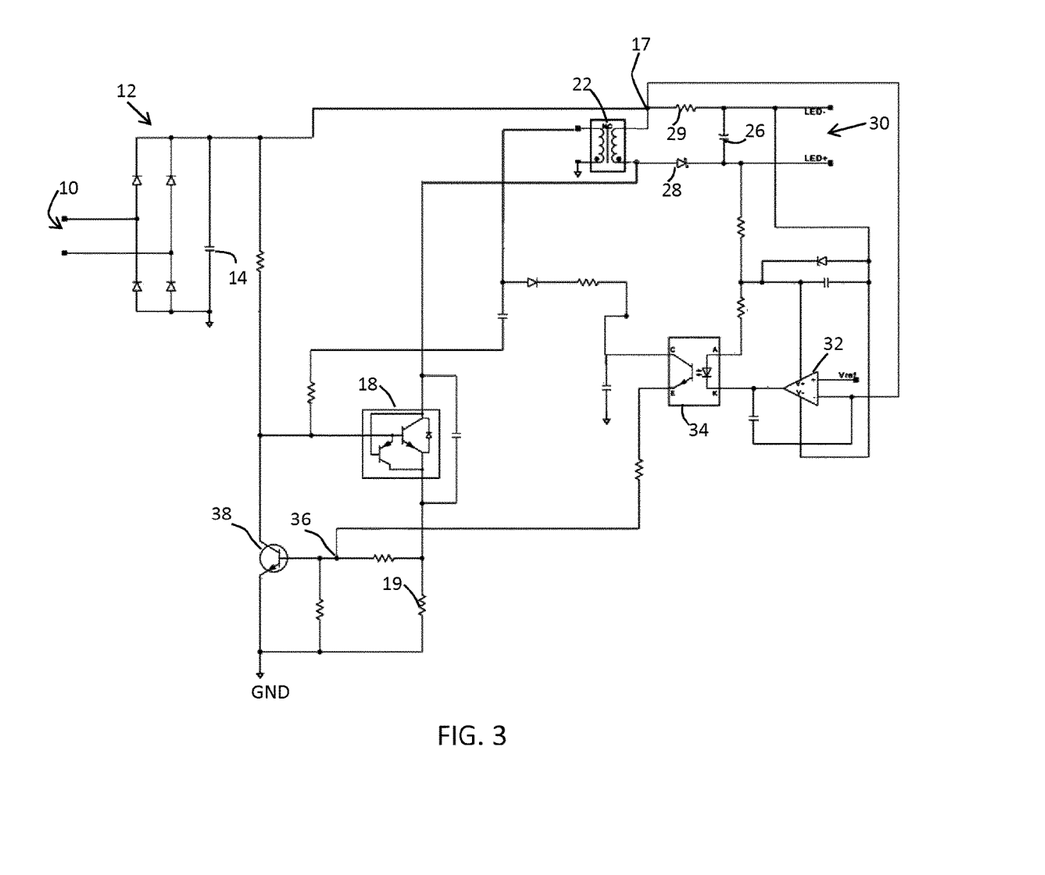
FIG. 3 shows a second known flyback LED driver.

FIG. 3 shows another example of a known buck-boost converter. The same references are used as in FIGS. 1 and 2 for the same components. This design does not have a fully isolated output, but has a floating output.

Again, the converter makes use of a transformer 22, with the flyback power stage at the right side of the transformer 22. In this example, in charging phase, the rectified input 17 is fed to the right side of the transformer 22 and back to the main converter switch 18; in discharging phase, the main converter switch 18 is turned off and the right side of the transformer 22 release energy to the load via output 30. The left side of the transformer 22 provides injection of current to the base of the main control switch 18 so as to control the cyclic operation in a self-oscillation manner.

The circuit has essentially the same feedback mechanism as in FIG. 1 for injecting current to the control terminal 36 of the control transistor 38.

Figure 4:
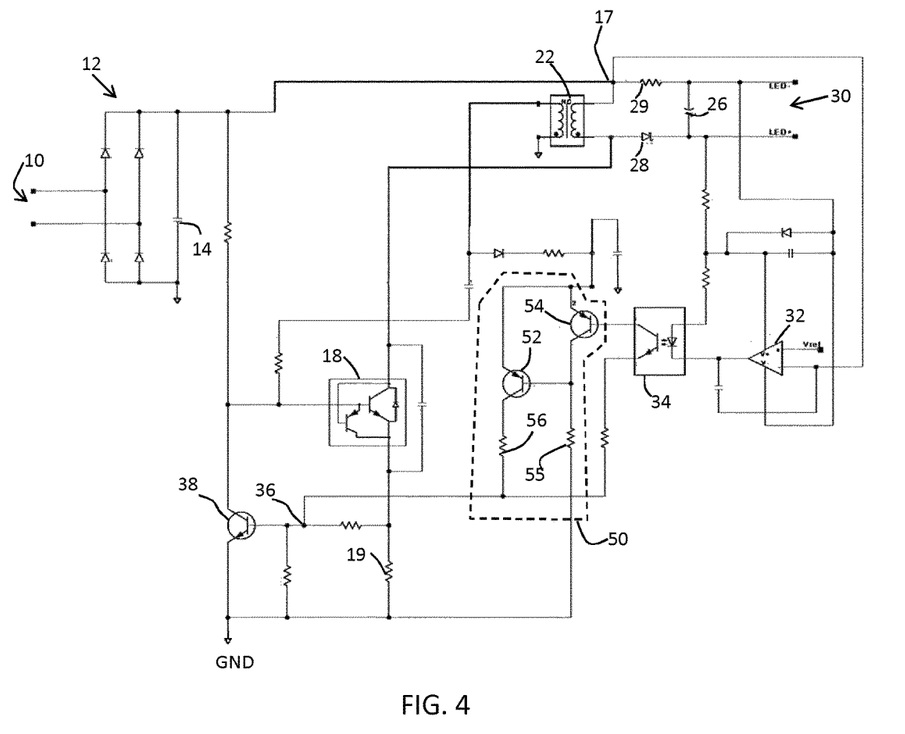
FIG. 4 shows a second example of a flyback LED driver in accordance with the invention based on the circuit of FIG. 3.

FIG. 4 shows that the circuit of FIG. 3 can be modified in the same way as the circuit of FIG. 2 to provide the soft start function. The same processing circuit 50 is added, with a pass transistor 52 for passing a current from the left side winding to the processing circuit output (i.e. to the node 36) when it is turned on. The control transistor 54 is again used for controlling the pass transistor 52. The control transistor 54 turns off the pass transistor 52 in response to the presence of a feedback signal, whereas the pass transistor is normally turned on (i.e. turned on by default) in the absence of actively being switched off switching by the control transistor 52.

The processing circuit 50 functions in the same way as explained above. It will be seen that the soft start circuit may be applied to different switch mode power converter architectures, including ringing choke flyback converter architectures (e.g. FIG. 1) as well as other flyback architectures (e.g. FIG. 3), and to PWM controlled designs.

Figure 5:
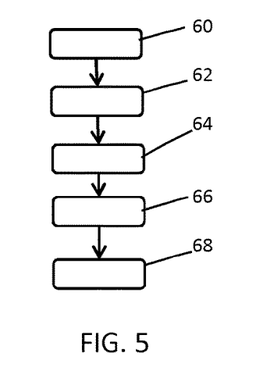
FIG. 5 shows an LED driving method.

The invention also provides an LED driving method as shown in FIG. 5. The method comprises:

in step 60, converting an input power supply using an inductive switch converter which comprises an inductive element and a main converter switch for controlling a current flowing through the inductive element;

in step 62, providing a current to an LED arrangement;

in step 64, generating a sensor signal indicative of the output current or voltage provided to the LED arrangement;

in step 66, processing the sensor signal which has been fed back to create a processed feedback signal for controlling the current flowing through the main converter switch, wherein a processed feedback signal is generated even when there is no sensor signal; and in step 68, feeding back the processed sensor signal for control of the main converter switch.

The processing simply passes the feedback signal without adaptation when the soft start mode has been completed.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. An LED driver, comprising:
    an inductive switch mode converter having an inductive component, an LED output for an LED load and a main converter switch for controlling a current flowing through the inductive component;
    a sensor for generating a sensor signal indicative of the output current or voltage provided to the LED output;
    a feedback element adapted to provides a feedback path for feeding back the sensor signal for control of the main converter switch;

the inductive switch mode converter comprises a control circuit that adapted to control the main converter switch by determining a sufficient level for current flowing through the main converter switch when the main converter switch starts to open, wherein said control circuit is adapted to take the sensor signal as a bias in reducing the sufficient level and the LED driver further comprises a processing circuit for processing the sensor signal which has been fed back, wherein the processing circuit is adapted to:

provide the sensor signal to the control circuit when there is the sensor signal; and generate an output to the control circuit when there is no sensor signal so as to be taken by the control circuit as a bias to reduce the sufficient level.

2. An LED driver as claimed in claim 1, wherein the switch mode converter comprises a flyback converter.

3. An LED driver as claimed in claim 2, wherein the switch mode converter comprises a transformer with a primary side and a secondary side with the LED output on the secondary side, wherein:

the main converter switch is on the primary side for controlling the current flowing through the primary side of the transformer;

the sensor is on the secondary side; and the feedback element provides a feedback path from the secondary side to the primary side for feeding back the sensor signal for control of the main converter switch.

4. An LED driver as claimed in claim 1, wherein the sensor comprises a comparator for comparing an output voltage from the secondary side of the transformer with a reference and providing a signal to the feedback path.

5. An LED driver as claimed in claim 1, wherein the feedback element comprises an optical coupler.

6. An LED driver as claimed in claim 1, wherein the converter comprises:

a first transformer winding, which is used to charge the control terminal of the main converter switch to turn on the main converter switch, wherein the main converter switch is coupled to a second transformer winding;

a shunt resistor through which a current is driven by the main converter switch;

the control transistor as the control which is turned on by the voltage across the shunt resistor when the current has reached the sufficient level, wherein the control transistor is coupled to the control terminal of the main converter switch and is adapted to turn off the converter main switch when it is turned on.

7. An LED driver as claimed in claim 6, wherein the processing circuit output is coupled to the control terminal of the control transistor thereby to inject current into the control terminal of the control transistor.

8. An LED driver as claimed in claim 7, wherein the processing circuit comprises a pass transistor for passing a current from the first transformer winding to the processing circuit output when the pass transistor is turned on, and a control transistor for controlling the pass transistor, such that the control transistor is adapted to turn off the pass transistor in response to the presence of a feedback signal, and the pass transistor is adapted to be turned on by default in the absence of switching by the control transistor.

9. An LED driver as claimed in claim 8, wherein the control transistor comprises a pnp bipolar transistor with its emitter coupled to the first transformer winding, its base coupled to the feedback element, and its collector coupled to ground through a resistor, and the pass transistor comprises a pnp bipolar transistor with its emitter coupled to the first transformer winding, its base coupled to the collector of the control transistor, and its collector coupled to the processing circuit output through a resistor.

10. An LED driver as claimed in claim 6, wherein:

the converter comprises a ringing choke converter, and wherein the first transformer winding comprises a transformer primary side auxiliary winding and the second transformer winding comprises a transformer primary side main winding; or the first transformer winding comprises a transformer secondary side winding and the second transformer winding comprises a transformer primary side winding.

11. An LED driving method, comprising:

converting an input power supply using an inductive switch mode converter which comprises an inductive element and a main converter switch for controlling a current flowing through the inductive element;

providing a current to an LED arrangement;

generating a sensor signal indicative of the output current or voltage provided to the LED arrangement; and feeding back the sensor signal for control of the main converter switch, controlling the main converter switch by determining a sufficient level for current flowing through the main converter switch when the main converter switch starts to open according to the sensor signal, wherein taking the sensor signal as a bias in reducing the sufficient level, wherein the method further comprises:

providing the sensor signal to the controlling when there is the sensor signal and generating an output to the controlling when there is no sensor signal, so as to be taken by the controlling as a bias to reduce the sufficient level.

12. A method as claimed in claim 11, wherein the switch mode converter comprises a transformer with a primary side and a secondary side, wherein the main converter switch is for controlling the current flowing through the primary side of the transformer, wherein generating a sensor signal comprises comparing an output voltage from the secondary side of the transformer with a reference.

13. A method as claimed in claim 11, wherein the converting comprises:

using a first transformer winding to charge the control terminal of the main converter switch to turn on the main converter switch, wherein the main converter switch is coupled to a second transformer winding;

driving a current through a shunt resistor by the main converter switch; and turning on a control transistor by the voltage across the shunt resistor when the current has reached a sufficient level, wherein the control transistor is coupled to the control terminal of the main converter switch and turns off the converter main switch when it is turned on.

14. A method as claimed in claim 13, comprising coupling the processing circuit output to the control terminal of the control transistor to inject current into the control terminal.

15. A method as claimed in claim 14, comprising passing a current from the first transformer winding to the processing circuit output when it is turned on using a pass transistor, and controlling the pass transistor to turn off in response to the presence of a feedback signal, and turning on the pass transistor by default in the absence of said controlling in response to the presence of a feedback signal.

* * * * *